(12) United States Patent
Womelsdorf et al.

(10) Patent No.: US 6,197,272 B1
(45) Date of Patent: Mar. 6, 2001

(54) METHOD FOR MANUFACTURING TRANSITION METAL CARBIDES AND/OR TRANSITION METAL CARBONITRIDES AND USE THEREOF TOGETHER WITH NOVEL TRANSITION METAL XEROGELS

(75) Inventors: Hermann-Jens Womelsdorf, Leverkusen; Gerd Passing, Köln; Nils Perchenek, Leverkusen, all of (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 09/066,920

(22) Filed: Apr. 27, 1998

(30) Foreign Application Priority Data

May 2, 1997 (DE) .............................. 197 18 525

(51) Int. Cl.[7] .......................... C01B 21/06; C01B 31/30; C01B 31/34
(52) U.S. Cl. .......................... 423/409; 423/439; 423/440
(58) Field of Search .................... 423/409, 439, 423/440

(56) References Cited

U.S. PATENT DOCUMENTS

| | | | |
|---|---|---|---|
| 3,379,647 | * 4/1968 | Smudski | 423/439 |
| 3,885,022 | * 5/1975 | Harris et al. | 423/439 |
| 4,333,915 | 6/1982 | Iwai et al. | 423/324 |
| 4,929,433 | * 5/1990 | Hexemer, Jr. et al. | 423/409 |
| 4,948,762 | * 8/1990 | Krumbe et al. | 423/409 |
| 4,996,174 | 2/1991 | Birchall et al. | 501/87 |
| 5,120,689 | 6/1992 | Birchall et al. | 501/99 |

FOREIGN PATENT DOCUMENTS

| | | |
|---|---|---|
| 042 660 A2 | 12/1981 | (EP) . |
| 239 302 A2 | 9/1987 | (EP) . |
| WO 89/05776 | 6/1989 | (EP) . |
| 881 175 A1 | 12/1998 | (EP) . |
| 2172 276 | 9/1986 | (GB) . |

OTHER PUBLICATIONS

European Search Report for foreign counterpart application EP 98 10 7412.3 (Aug. 25, 1998).

H. Preiss, B. Meyer, and C. Olschewski, Preparation of Molybdenum and Tungsten Carbides from Solution Derived Precursors, in *Journal of Materials Science*, Bd. 33, Nr. 3, pp. 713–22, XP–000733021 (Feb., 1998).

Derwent English Abstract XP002074463 for JP 57 017 412 (Jan. 29, 1982).

EPO Patent Abstracts of Japan for JP 56 155 013 (Jan. 2, 1981).

Derwent English Abstract XP–002074481 for Japanese Journal article entitled "Synthesis of Precursors for Ceramics and their Nitrildes and Carbides Formation," by Kazuyuk Kuroda, Yoshiyuki Sugahara, and Chuzo Kato, published in *Kenkyu Hokoku–asahi Garasu Zaidan*, vol. 57, pp. 347–54 (1990) and published in *Chemical Abstracts*, vol. 115, No. 12 (Sep. 23, 1991).

\* cited by examiner

*Primary Examiner*—Wayne Langel
(74) *Attorney, Agent, or Firm*—Connolly, Bove, Lodge & Hutz LLP

(57) ABSTRACT

The present invention relates to a method for manufacturing transition metal carbides and/or transition metal carbonitrides and the use thereof together with novel transition metal xerogels.

20 Claims, No Drawings

METHOD FOR MANUFACTURING TRANSITION METAL CARBIDES AND/OR TRANSITION METAL CARBONITRIDES AND USE THEREOF TOGETHER WITH NOVEL TRANSITION METAL XEROGELS

BACKGROUND OF THE INVENTION

1. Field of the Invention

The present invention relates to a method for manufacturing transition metal carbides and/or transition metal carbonitrides and the use thereof together with novel transition metal xerogels.

2. Description of the Prior Art

Transition metal carbides are because of their great hardness of major importance for the hard metal industry. They are used in particular for the manufacture of cutting tools. Hardness and wear resistance increase, moreover, with decreasing grain size of the carbides. The manufacture of particularly fine-particle carbides, in particular those with grain sizes of less than 1 $\mu$m, is therefore of great interest.

The manufacture of transition metal carbides from their oxides by solid-phase carburization with graphite at temperatures of between 1400° and 2000° C. is known. Sub-$\mu$ carbides are obtainable in this manner only by laborious grindings of the products or by the use of expensive, extremely finely-divided educts.

WC powders with mean particle sizes of less than about 0.5 $\mu$m cannot be prepared in this manner, and some novel methods of preparation have therefore been developed in recent times.

In DE-A 4 214 725 a gas-phase process is described with which extremely finely-divided particles for non-oxide ceramics can be produced. This process is highly complicated in equipment terms, however, as is also the process described in WO 91/07244 for the manufacture of WC/Co composites by the spray drying of co-precipitated W/Co salts and subsequent reduction to the metal powders with downstream carburization to the carbidic WC-Co mixed phase.

In U.S. Pat. No. 5,372,797 the carburization of tungsten trioxide in a reactive gas atmosphere consisting of hydrogen and methane is described.

In EP-A 0 239 301 the manufacture of carbide precursors of the 4th to 6th sub-groups by transesterification of the metal alkoxides with polyols and subsequent precursor pyrolysis to the desired carbides is described.

In JP-A 56-155 013 a similar method is described, with the difference that the metals can be used not only as alkoxides, but also in the form of their halides and oxohalides.

The known solutions have the following disadvantages: The conventional method of the solid-phase carburization of metals or metal oxides with graphite powder requires as a rule temperatures of more than 1400° C. and yields products with mean particle sizes of more than 1 $\mu$m, which have to be worked up with a correspondingly high amount of grinding and sorting. In addition, extensive grindings in general impair the powder properties.

The carburization in a reactive gas atmosphere yields as a rule sub-stoichiometric products.

Precursors from alkoxides are too expensive for hard metal powders, since the alkoxides required are not available commercially in large amounts and their manufacture is complicated. Precursors containing halides are not very suitable on environmental grounds.

The object of the invention was therefore to provide a simple process which is suited to manufacturing sub-s carbides and carbonitrides of the 5th and 6th sub-groups with mean particle sizes of less than 0.5 $\mu$m on a large scale and at a modest price from commercially available, low-cost educts and thereby to meet the increasing requirements as to their finely divided character.

SUMMARY OF THE INVENTION

It was found that transition metal carbides and/or carbonitrides of the 5th and 6th subgroups with a mean particle diameter of <0.5 $\mu$m can be manufactured if at least one transition metal oxide is reacted with at least one organic compound comprising at least two OH groups, surplus portions of the organic compound are then drawn off and the product so obtained is pyrolyzed in an inert gas atmosphere and/or vacuum, or, in order to obtain carbonitrides, under a nitrogen-containing atmosphere.

DESCRIPTION OF THE PREFERRED EMBODIMENTS

The invention therefore provides a process for manufacturing transition metal carbides and/or carbonitrides of the 5th and 6th sub-groups with a mean particle diameter of <0.5 $\mu$m, according to which at least one transition metal oxide is reacted in at least an organic compound containing at least two OH groups, preferably at temperatures between room temperature and the boiling point of the mixture, i.e. preferably between 20 and 300° C., surplus portions of the organic compound are then drawn off and the product so obtained is pyrolyzed preferably at temperatures between 300° C. and the sintering temperature, i.e. between 300 and 4000° C., preferably between 600 and 2000° C., particularly preferably between 900 and 1300° C., of the respective carbide in an inert gas atmosphere and/or vacuum, or, in order to obtain carbonitrides, under a nitrogen atmosphere.

The pressure in the inert gas or nitrogen atmosphere comes to 100 mbar to 5 bar, particularly preferably 500 mbar to 1.2 bar.

By vacuum is meant here preferably a pressure range from 100 to 0.01 mbar, preferably 30 to 0.1 mbar.

In a preferred embodiment of the invention the pressure during the pyrolysis comes to between 0.01 mbar and 5 bar, preferably 0.1 mbar and 1.2 bar.

The transition metal carbide and/or carbonitride of the 5th and 6th sub-groups manufactured by the process according to the invention is preferably vanadium, molybdenum and/or tungsten carbide and/or vanadium carbonitride.

The term carbides covers here both the stoichiometric compounds such as e.g. WC, $W_2C$, $Mo_2C$ and the compounds in their respective homogeneity range. By homogeneity range of the respective compound is to be understood the range in the associated phase diagram in which the compound is present as a single phase.

The mean particle diameter <0.5 $\mu$m was determined here by the analysis of TEM exposures. The number average is involved here.

The transition metal oxide used in the process according to the invention is preferably an inorganic polyacid or an inorganic oxide.

The metal compounds of the 5th and 6th sub-groups designated as polyacids can be e.g. iso- or heteropolyacids (see e.g. Römpp, 9th edition, Georg Thieme Verlag, pp. 1789 and 2073). Preferably isopolyacids are used, particularly preferably their ammonium salts, more particularly preferably ammonium metavanadate, ammonium heptamolybdate and ammonium paratungstenate.

In a preferred embodiment of the invention there are used as transition metal oxides mixtures of polyacids of various metals, such as e.g. a mixture of ammonium metavanadate and ammonium paratungstenate.

The organic compounds used in the process according to the invention that comprise at least two OH groups are preferably compounds which comprise $2 \leq n \leq 10$ OH groups.

There are used as compounds containing OH groups preferably di- or trivalent alcohols such as e.g. ethylene glycol, propanediol, butanediol, glycerol or alternatively mixtures of the latter and compounds with more than two OH groups, such as e.g. pentaerythritol sugar alcohols such as sorbitol or mannitol, saccharose etc. Particularly preferred are mixtures of a divalent alcohol and a sugar or sugar alcohol, more particularly preferred are ones of ethylene glycol and sorbitol.

In a further embodiment of the process according to the invention the reaction takes place preferably in a solvent. Also acting as solvent here, in addition to the organic compounds comprising at least 2 OH groups, can be e.g. water or sodium hydroxide solution. Preferably, however, the organic compound comprising the OH groups is used as solvent, which organic compound also acts as a reactant.

In the event of only one organic compound comprising at least 2 OH groups being used in the process according to the invention, the latter is preferably added in an amount such that the transition metal oxide dissolves therein.

In a second embodiment the transition metal oxide is initially dissolved in an organic compound with two OH groups, preferably a diol, and reacted therewith. The solvent is removed and the residue is purified by washing or recrystallisation. The powder obtained is then again dissolved in a suitable solvent and reacted with an organic compound having more than two OH groups. The product of this reaction is dried and subsequently pyrolyzed.

In the event of a mixture of at least one organic compound comprising at least two OH groups and at least one organic compound comprising more than two OH groups is used in the process according to the invention, the OH-functional compound is preferably used for the dissolving of the transition metal oxide that comprises the smallest proportion of OH groups. The organic compound comprising further OH groups is used in a molar ratio of 0.02–1:2, with respect to the metal content of the transition metal oxide.

In a preferred embodiment of the invention the temperature during the reaction and also during the dissolution lies 1 to 20° C. below the boiling point of the organic hydroxyl-group-containing compound used or of the mixture.

In a preferred embodiment the precursor material is firstly, prior to the pyrolysis, heat-treated at a temperature of between 100 and 200° C. in a vacuum for 1–3 hours.

The pyrolysis is preferably conducted in at least two stages, i.e. in a low-temperature stage up to a temperature of between 200 and 300° C. and in a high-temperature stage up to the end temperature, which lies below the sintering temperature, preferably up to 2000° C., particularly preferably up to a temperature between 900 and 1300° C. The pyrolysis can take place under an inert gas and/or vacuum or, for the manufacture of the carbonitrides, wholly or partly under a nitrogen atmosphere.

If the pyrolysis is conducted in more than one pyrolysis step, it is preferable to crush and/or to grind the sue at least once between two pyrolysis steps. Beater, cutting, fluidised-bed counter-current and pearl mills are preferred for the crushing and grinding.

In a further preferred embodiment of the invention there is carried out after the reaction a thermal after-treatment under a hydrogen atmosphere or a hydrogen/inert gas mixture at temperatures of 600° C.<T<the sintering temperature, preferably below 1500° C.

Although this invention is not limited to an individual system, the preparation of WC will be exemplified below, in order to illustrate the main features of the invention.

The process according to the invention is carried in general as follows: the transition metal compound is firstly dissolved in a mixture of the OH components at an elevated temperature. In a preferred embodiment ammonium paratungstenate is dissolved and reacted in a mixture of ethylene glycol and sorbitol at temperatures just below the boiling point of the ethylene glycol. Alternatively the reaction can also be carried out in other mixtures, for example in 1,2-propanediol and sorbitol. The molar ratio of tungsten:sorbitol is between 0 and 2, in a particularly preferred embodiment between 0.1 and 1 and in a more particularly preferred embodiment from 0.4 to 0.7. Surplus solvent is then distilled off, so that a polymeric precursor is obtained in which the transition metal is molecularly distributed in a homogeneous manner. The degree of crosslinking of this polymeric precursor is increased both by the ratio of the OH compounds to one another and to the transition metal compound used and by the temperature under vacuum below the decomposition temperature. The precursor is pyrolysed to the desired carbide under an inert gas atmosphere. In a preferred embodiment the pyrolysis is carried out in a plurality of stages. First of all, the precursor is heated under a protective gas to approx. 300° C., then under vacuum to approx. 1000° C. At the same time decomposition reactions occur, in the course of which a considerable part of the organic material is led off with the inert gas stream and by the vacuum. The transition metal is via intermediate oxidide stages reduced to the metal, which is present finely distributed together with carbon and is converted to the carbide in a second pyrolysis stage in a high-temperature furnace, preferably in a graphite crucible at temperatures between 1100 and 1400° C. In a particularly preferred embodiment an amorphous intermediate product is crushed and/or ground.

The manufacture of a carbonitride, e.g. of the vanadium carbonitride, can take place in an analogous manner, with the difference that the pyrolysis suitably takes place under a nitrogen-containing atmosphere.

The invention provides in addition transition metal xerogels, obtainable by the reaction of at least one transition metal oxide with at least one organic compound comprising at least two OH groups at temperatures between room temperature and the boiling point of the mixture, i.e. preferably between 20 and 300° C., and subsequent drawing off of the surplus portions of the organic compound.

The invention further provides for the use of the transition metal carbides manufactured by the process according to the invention as powders for the hard metal industry or as catalysts, e.g. as a substitute for platinum metals, such as for dehydrogenation reactions for example.

The invention will be further explained by means of the following examples, without being limited to said examples.

EXAMPLES

Example 1
Manufacture of a W-Xerogel 125 g of ammonium paratungstenate, 275 g of ethylene glycol and 39 g of sorbitol were heated to 190° C. in an argon-purged 2 l three-neck flask until a homogeneous, light-brown solution was obtained. Lower-boiling reaction products were liberated continuously. Thereafter surplus ethylene glycol was distilled off, firstly at standard pressure, then up to 160° C. sump temperature under a vacuum of 0.05 mbar. 175 g of a solid, foamy mass remained behind.

Example 2
Manufacture of Tungsten Carbide 20 g of the material from Example 1 were pyrolyzed for six hours at 1100° C. in a nitrogen stream in an aluminium oxide boat in a tubular furnace. 9.7 g of intermediate product were obtained. 4 g of this material were reacted to completion in a second pyrolysis stage up to 1200° C. with an hour holding time in a graphite crucible furnace under a slight nitrogen overpressure (approx. 0.1 bar). 3.9 g of black-grey powder were obtained.

The product contained according to X-ray diffractometric analysis exclusively WC. Ultimate analyses with a CS-MAT and an ON-MAT (both instruments of the company Ströhlein, Germany) produced a C-content of 6.07% and an O-content of 0.21%. Transmission electron microscope pictures of a powder ground up by hand in a boron carbide mortar showed primary particles with a diameter of between approx. 30 and 150 nm. The estimation of the crystallite size from the half-width values of the strongest peaks of the X-ray diffractometric measurement yielded a crystallite size of 33 nm.

Example 3
Manufacture of a W-Xerogel 750 g of ammonium paratungstenate, 1650 g of ethylene glycol and 312.2 g of sorbitol were reacted to form 1093 g of precursor material by the process given in Example 1.

Example 4
Manufacture of Tungsten Carbide 750 g of the precursor material manufactured in Example 3 were pyrolyzed in a quartz boat in an evacuable furnace to 1100° C. with an hour holding time. The process was operated under a nitrogen stream to 300° C., thereafter under vacuum 1 mbar$\leq$p$\leq$100 mbar. During the cooling phase flooding with nitrogen took place from 960° C. onwards. 371 g of product were obtained and further pyrolyzed in a graphite crucible furnace under a slight nitrogen overpressure (0.1 bar) nitrogen up to 1200° C. with an hour holding time. 366 g of a grey-black powder were obtained.

The product contained according to X-ray diffractometric analysis exclusively WC. Ultimate analyses with a CS-MAT and an ON-MAT (both instruments of the company Ströhlein, Germany) produced a C-content of 6.12% and an O-content of 0.16%. Transmission electron microscope pictures of a powder ground up by hand in a boron carbide mortar showed primary particles with a diameter of between approx. 20 and 100 nm. The estimation of the crystallite size from the half-width values of the strongest peaks of the X-ray diffractometric measurement yielded a crystallite size of 27 nm. The specific surface of the material was determined as 8.6 m$^2$/g by nitrogen adsorption according to the BET method (DIN 66131).

Example 5

Manufacture of tungsten carbide as in Example 4, but with grinding of the end product. 595 g of a precursor material manufactured according to Example 3 were reacted as under Example 4. The tungsten carbide obtained was ground wet in n-hexane in a pearl mill (of the company Netzsch Feinmahltechnik (GmbH, Germany). The dried powder was after-treated thermally at 1200° C. for a holding time of 2 hours. 263 g of product were obtained.

The product contained according to X-ray diffractometric analysis exclusively WC. Ultimate analyses with a CS-MAT and an ON-MAT (both instruments of the company Ströhlein, Germany) produced a C-content of 6.13% and an O-content of 0.25%. Transmission electron microscope pictures showed primary particles with a diameter of between approx. 30 and 150 nm. The estimation of the crystallite size from the half-width values of the strongest peaks of the X-ray diffractometric measurement yielded a crystallite size of 25 nm.

Example 6
Manufacture of Tungsten Carbide 100 g of ammonium paratungstenate and 500 g ethylene glycol were heated to 190° C. in an argon-purged 2 l three-neck flask until a homogeneous light-brown solution was obtained. Lower-boiling reaction products were continuously destilled off. Thereafter surplus ethylene glycole was destilled off in vacuo at 120° C. An off-white residue remained behind which was purified by recrystallization.

The purified powder was dissolved in hot methanol and reacted with 34.7 g sorbitol dissolved in hot methanol as well.

After drying 65 g of a white powder were obtained.

10 g of this powder were firstly pyrolyzed up to 100° C. in an aluminum oxide boat in a tubular furnace and thereafter in a graphite crucible at a temperature of 1300° C. 4.6 g of a grey-black powder were obtained.

According to X-ray diffractometric measurement the powder consisted exclusively of tungsten carbide. Ultimate analysis with a CS-MAT and an ON-MAT (both of Ströhlein, Germany) produced a C-content of 6.17% and an O-content of 0.12%.

Example 7
Manufacture of Vanadium Carbide 20 g of ammonium metavanadate, 350 g of ethylene glycol and 14 g of sorbitol were converted to 29.7 g of precursor material by the process given in Example 1.

15 g of this material were pyrolyzed for six hours at 1100° C. in an argon stream in an aluminium oxide boat in a tubular furnace. 3.9 g of black-grey powder were obtained.

The product contained according to X-ray diffractometric analysis exclusively vanadium carbide. Ultimate analyses with a CS-MAT and an ON-MAT (both instruments of the company Ströhlein, Germany) produced a C-content of 18.72% and an O-content of 0.47%. Transmission electron microscope pictures of a powder ground up by hand in a boron carbide mortar showed distinctly crystalline primary particles with a diameter of between approx 50 and 200 nm. The estimation of the crystallite size from the half-width values of the strongest peaks of the X-ray diffractometric measurement yielded a crystallite size of 89 nm.

What is claimed is:

1. A process for manufacturing a Group Vb or Group VIb transition metal carbide, transition metal carbonitride or mixture thereof, the process comprising:
   a. reacting at least one Group Vb or Group VIb transition metal oxide with at least one organic compound containing at least two hydroxyl groups to form a reaction mixture, b. removing surplus organic compound from the reaction mixture to form a reaction product; and c. pyrolyzing the reaction product in an inert gas atmosphere, a vacuum or a combination thereof to form the Group Vb or Group VIb transition metal carbide, transition metal carbonitride or mixture thereof, with a mean particle size of less than 0.5 μm.

2. The process according to claim 1, wherein the at least one Group Vb or Group VIb transition metal oxide is at least one inorganic polyacid or at least one inorganic oxide.

3. The process according to claim 2, wherein the at least one inorganic polyacid is at least one Group Vb or Group VIb metal polyacid.

4. The process according to claim 3, wherein the at least one Group Vb or Group VIb metal polyacid is ammonium vanadate, ammonium molybdate, ammonium tungstenate, or a mixture thereof.

5. The process according to claim 1, wherein the at least one organic compound contains between two and ten hydroxyl groups.

6. The process according to claim 1, wherein at least two organic compounds are present, the first organic compound containing two or three hydroxyl groups and the second organic compound containing more than two hydroxyl groups.

7. The process according to claim 6, wherein the first organic compound is ethylene glycol, propanediol, butanediol, glycerol, or a mixture thereof and the second organic compound is pentaerythritol, a sugar alcohol, or a mixture thereof.

8. The process according to claim 7, wherein the sugar alcohol is sorbitol, mannitol, saccharose, or a mixture thereof.

9. The process according to claim 1, wherein the reacting step a) is carried out in a solvent.

10. The process according to claim 9, wherein the solvent is the at least one organic compound, water, a sodium hydroxide solution, or a mixture thereof.

11. The process according to claim 1, wherein the reacting step a) is carried out at a temperature of from 1 to 20° C. below the boiling point of the at least one organic compound or the reaction mixture.

12. The process according to claim 1, wherein the pyrolyzing step c) is carried out in at least two stages.

13. The process according to claim 12, wherein the second pyrolyzing stage is carried out at a temperature which is higher than a temperature of the first pyrolyzing stage.

14. The process according to claim 12, further comprising crushing, grinding, or crushing and grinding the reaction mixture at least once between the at least two pyrolyzing stages.

15. The process according to claim 1, further comprising after the pyrolyzing step c):

d) thermally after-treating the Group Vb or Group VIb transition metal carbide, transition metal carbonitride or mixture thereof, under an atmosphere which is hydrogen or a mixture of hydrogen and an inert gas, at a temperature of between 600° C. and a sintering temperature of the Group Vb or Group VIb transition metal carbide, transition metal carbonitride or mixture thereof.

16. The process according to claim 15, wherein the sintering temperature is greater than or equal to 1500° C.

17. The process according to claim 13, wherein the temperature of the second pyrolyzing stage is between 900 and 1300° C.

18. A process for manufacturing a Group Vb or Group VIb transition metal carbide, transition metal carbonitride or mixture thereof, the process comprising:

a) reacting at least one Group Vb or Group VIb transition metal oxide with at least one organic compound containing at least two hydroxyl groups to form a reaction mixture;

b) removing surplus organic compound from the reaction mixture to form a reaction product; and c) pyrolyzing the reaction product in an inert gas atmosphere, a vacuum or a combination thereof, at a temperature of between 900 and 1300° C. to form the Group Vb or Group VIb transition metal carbide, transition metal carbonitride or mixture thereof, with a mean particle size of less than 0.5 μm.

19. The process according to claim 18, wherein the Group Vb or Group VIb transition metal carbide, transition metal carbonitride or mixture thereof has a mean particle size of less than 0.5 μm.

20. The process according to claim 19, wherein the pyrolyzing step c) is carried out under a wholly or partly nitrogen-containing atmosphere.

* * * * *

UNITED STATES PATENT AND TRADEMARK OFFICE
CERTIFICATE OF CORRECTION

PATENT NO. : 6,197,272 B1
DATED : March 6, 2001
INVENTOR(S) : Hermann-Jens Womelsdorf; Gerd Passing; and Nils Perchenek.

It is certified that error appears in the above-identified patent and that said Letters Patent is hereby corrected as shown below:

<u>Title page, item [56],</u>
References Cited, OTHER PUBLICATIONS:
In the listing for the Derwent English Abstract XP-002074481, at line 3:

"Nitrildes" should read -- Nitrides --;
"Kazuyuk" should read -- Kazuyuki --.
In the listing for the Derwent English Abstract XP-002074481, at line 5:

"asahi" should read -- Asahi --.

Signed and Sealed this

Sixteenth Day of October, 2001

*Attest:*

NICHOLAS P. GODICI
*Attesting Officer*    *Acting Director of the United States Patent and Trademark Office*